A. E. NICHOLLS.
OIL FEEDER.
APPLICATION FILED JUNE 26, 1919.
1,346,840.
Patented July 20, 1920.
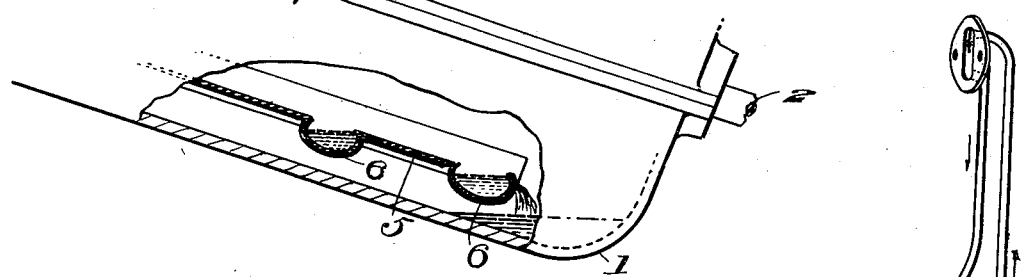
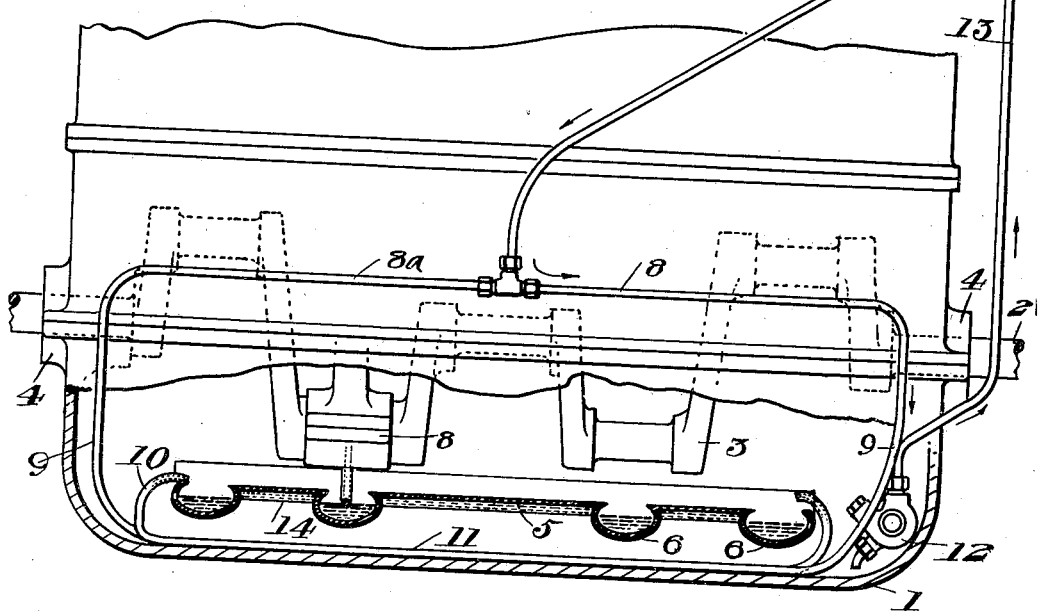
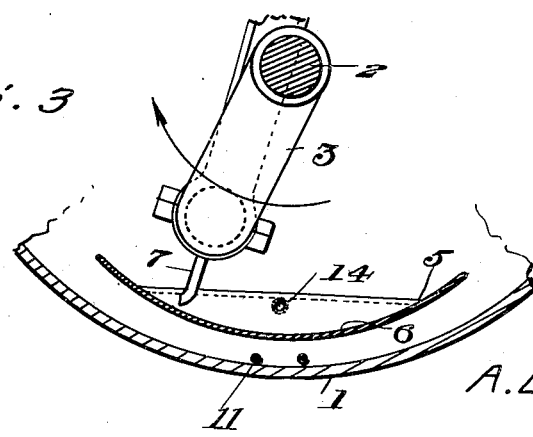
WITNESSES
INVENTOR
A. E. NICHOLLS,
BY
ATTORNEYS

UNITED STATES PATENT OFFICE.

ALBERT E. NICHOLLS, OF WILSON CREEK, WASHINGTON.

OIL-FEEDER.

1,346,840.

Specification of Letters Patent.  Patented July 20, 1920.

Application filed June 26, 1919. Serial No. 306,972.

*To all whom it may concern:*

Be it known that I, ALBERT E. NICHOLLS, a citizen of the United States, and a resident of Wilson Creek, in the county of Grant and State of Washington, have invented certain new and useful Improvements in Oil-Feeders, of which the following is a specification.

My invention is an improvement in oil feeders, and has for its object to provide a feeder of the character specified especially adapted for use with internal combustion engines of motor vehicles, wherein the arrangement is such that all of the bearings of the crank shaft will be thoroughly lubricated, regardless of the degree of inclination of the oil pan, insuring thus perfect lubrication when the vehicle is on the level or ascending or descending hills.

In the drawings:

Figure 1 is a side view, with parts broken away;

Fig. 2 is a similar view showing the pan inclined as in hill climbing.

Fig. 3 is an end view, the oil pan and crank shaft being in section.

The present embodiment of the invention is shown in connection with the crank case 1 of a motor vehicle of usual construction, the crank shaft 2 having the cranks 3 and being journaled in bearings 4 in the crank case. The oil pan 5, arranged beneath the crank shaft, has longitudinally extending troughs or gutters 6 registering with the cranks, and through which are adapted to move the feeding tubes 7 of the bearings 8 on the cranks.

These feeding tubes take up a portion of the oil at each stroke of the crank, thus thoroughly lubricating the bearing. On the level, the system works properly because the level of the oil is approximately constant and all of the troughs are filled. On an incline, however, either ascending or descending, the oil tends to flow from the highest portion of the pan to the lowest, as shown in Fig. 2, so that the uppermost troughs 6 will be empty, while the lower troughs 6 will be overflowing. Thus a portion of the bearings will not be lubricated at a time when lubrication is needed most, that is, when the engine is working hardest.

To overcome this objection, I change the cross sectional shape of the troughs, as shown in Figs. 1 and 2, making the said cross section greater than a half circle, *i. e.*, the side walls of the troughs are undercut, so that when the oil pan is tilted as shown in Fig. 2 the oil will not tend to run out so quickly, a portion being held by the undercut side walls.

The supply pipe 7 for the oil passes to a point about the center of the opening and branches as indicated at 8 and 8ª. These branches extend toward opposite corners of the crank case and then down as indicated at 9. Each branch extends transversely beneath the pan as shown at 11 and delivers to the adjacent trough at the adjacent end thereof. Since one branch 10 delivers at one side of the trough and the other at the other end, the oil will feed to the highest trough, regardless of the position of the crank case.

In order to insure a uniform level of the oil in the grooves they are connected by cross pipes 14 between the troughs and at the centers of the troughs, as shown more particularly in Fig. 3. These cross pipes are near the tops of the grooves, that is, they are just below the bottom of the pan, it being understood that the grooves are depressed below the general level of the bottom of the pan.

In operation, when the vehicle is on a hill either ascending or descending, the oil is fed to the highest groove, from whence it is fed to the next highest groove and so until the vehicle is again on the level. Then the oil flows to both front and rear end grooves, from them by pipes 14 to the other grooves, thus at all times keeping up a constant and perfect system of lubrication.

I claim:

In a motor vehicle, the combination with the crank case, the crank shaft having cranks; of an oil pan located within the crank case and spaced above the bottom thereof, said pan being formed at intervals with depressed portions extending transversely thereof beneath said cranks, the bottoms of said depressed portions being arcuate and concentric with the crank shaft, oil feed pipes having their discharge ends extending over the end portions of the pan and discharging into the endmost channels, the adjacent walls of the successive channels being provided with holes, and tubes extending through said holes and establishing communication between the successive channels, the channels permitting the passage of the oil supply tubes of the crank bearings.

ALBERT E. NICHOLLS.